United States Patent [19]

Brennan

[11] 4,444,919
[45] Apr. 24, 1984

[54] USE OF POLYETHYLENE TEREPHTHALATE LIQUID WASTE STREAMS CONTAINING GLYCOLS AS RIGID POLYOL EXTENDERS

[75] Inventor: Michael E. Brennan, Austin, Tex.

[73] Assignee: Texaco Inc., White Plains, N.Y.

[21] Appl. No.: 443,848

[22] Filed: Nov. 22, 1982

[51] Int. Cl.³ .............................................. C08G 18/14
[52] U.S. Cl. ...................................... 521/172; 521/48; 521/173
[58] Field of Search .......................... 521/172, 173, 48

[56] References Cited

U.S. PATENT DOCUMENTS 4,100,354  7/1978  Owen .................................. 521/173

Primary Examiner—Maurice J. Welsh
Attorney, Agent, or Firm—Jack H. Park; Kenneth R. Priem; David L. Mossman

[57] ABSTRACT

A method for using polyethylene terephthalate liquid waste streams which contain mono- and polyethylene glycols as polyol extenders in the manufacture of rigid foam is described. Extenders such as this cut down on the polyol expense in rigid foams with no decrease in quality. They are useful in rigid polyurethane and rigid polyisocyanurate foam production.

3 Claims, No Drawings

USE OF POLYETHYLENE TEREPHTHALATE LIQUID WASTE STREAMS CONTAINING GLYCOLS AS RIGID POLYOL EXTENDERS

CROSS-REFERENCE TO RELATED APPLICATIONS

This application is related to U.S. patent application Ser. No. 443,726, filed Nov. 22, 1982, which relates to polyol production from the reaction of polyethylene terephthalate residues with glycols and amino alcohols and U.S. patent application Ser. No. 443,779, filed Nov. 22, 1982, which concerns polyols made from the reaction of polyethylene terephthalate with the reaction product of a dibasic acid and an alkylene glycol, all filed of even date.

BACKGROUND OF THE INVENTION

1. Field of the Invention

The invention relates to polyols for rigid foams and more particularly relates to polyol extenders made from terephthalic acid waste streams.

2. Description of Other Relevant Methods in the Field

It is known to prepare polyurethane foam by the reaction of a polyisocyanate, a polyol and a blowing agent such as a halogenated hydrocarbon, water or both, in the presence of a catalyst. One particular area of polyurethane technology is based upon rigid polyurethane foams.

The art is replete with a wide variety of polyols useful as one of the main components in preparing polyurethanes such as polyurethane foams. As an example, U.S. Pat. No. 2,965,615 suggests use of co-polymers of alkenyl-substituted aromatic compounds such as styrene, and ethylenically unsaturated monohydric alcohols such as allyl alcohol as a useful resinous polyol in urethane production. Also disclosed as useful polyol sources are alkoxylated reaction products of the above co-polymers.

Further, U.S. Pat. No. 4,094,828 describes how a polyol combination comprising a co-polymer of allyl alcohol and styrene and a polyether polyol provides for rigid polyurethane foams possessing unusual dimensional stability and heat distortion properties. Amino polyols may be modified with epoxy resin and alkylene oxides according to the invention disclosed in U.S. Pat. No. 4,309,532. These modified polyols produce rigid polyurethane foams that have higher heat distortion temperatures and better low temperature properties than foams with polyols not modified in such a fashion.

Rigid foams generally have good insulative properties and are thus desirable for use in building insulation. As with all building materials, it is desirable to provide rigid foams that are as fire resistant as possible. One approach to this goal is to modify the polyol.

Polyisocyanurate foams are a type which are considered to be fire resistant and show low smoke evolution on burning. However, polyisocyanurate foams tend to be brittle or friable. Various types of polyols have been devised to lower the foam friability, but what frequently happens is that the fire and smoke properties of the polyisocyanurate foam deteriorate. Thus, a fine balance exists between the amount and type of polyol one adds to a polyisocyanurate foam formulation in order to maintain maximum flame and smoke resistance while at the same time reach an improvement in foam friability. U.S. Pat. Nos. 4,039,487 and 4,092,276 describe attempts at this fine balance, although each has its disadvantages.

Scrap polyalkylene terephthalate, such as polyethylene terephthalate (PET) is known to be incorporated into polyurethanes. For example, U.S. Pat. No. 4,048,104 relates that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another case where terephthalic acid residues are employed is outlined in U.S. Pat. No. 4,246,365 where polyurethanes are made from polyesters containing at least two hydroxyl groups and terephthalic acid residues.

More relevant to the compounds of this invention is the solution proposed in U.S. Pat. No. 4,237,238. In this patent, a polyol mixture is prepared by the transesterification of a residue from the manufacture of dimethyl terephthalate with a glycol, which is then used to produce polyisocyanurate foams having a combination of a high degree of fire resistance with low smoke evolution, low foam friability and high compressive strength. The preparation of such a polyol mixture (from ethylene glycol and dimethyl terephthalate esterified oxidate residue) is described in U.S. Pat. No. 3,647,759. J. M. Hughes and John Clinton, in the Proceedings of the S.P.I. 25th Annual Urethane Division Technical Conference, Scottsdale, Ariz. (October 1979), describe other foams prepared from the polyols of U.S. Pat. No. 3,647,759.

Another type of polyisocyanurate foam employs a polyol blend using both amide diols and primary hydroxyl polyols to give a foam having a high reaction exotherm, making it particularly suited to the preparation of polyisocyanurate foam laminates, according to U.S. Pat. No. 4,246,364.

There is still a need for a rigid polyurethane foam that has a high flame resistance. Part of the problem with the polyols of U.S. Pat. No. 3,647,759 is that they are not very compatible with trichlorofluoromethane, the gas entrapped in closed-cell rigid foams, which accounts for the excellent insulating properties of these foams.

SUMMARY OF THE INVENTION

The invention concerns a method for producing a rigid foam comprising reacting in the presence of a blowing agent and a catalyst, an organic polyisocyanate and a polyol component which comprises a liquid waste stream from polyethylene terephthalate manufacture which comprises polyethylene terephthalate oligomers and mono- and polyethylene glycols.

DETAILED DESCRIPTION OF THE PREFERRED EMBODIMENTS

In general, it has been discovered that rigid foams may be made using a mixture of aromatic amino polyols and the polyol extenders of this invention. In addition, such a polyol mixture is compatible with the trichlorofluoromethane blowing agent.

The polyol extender is a polyethylene terephthalate (PET) manufacture residue or waste stream which contains polyethylene terephthalate oligomers and monoand polyethylene glycols. The residue must contain compounds which have the moiety

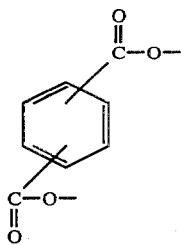

and ethylene glycols, such as monoethylene glycol, diethylene glycol and triethylene glycol.

Generally, the polyester polyethylene terephthalate is formed from ethylene glycol by direct esterification or by catalyzed ester exchange between ethylene glycol, terephthalic acid and and dimethyl terephthalate, respectively. Besides long chain polymers of polyethylene terephthalate, there are also formed polyethylene terephthalate oligomers, diethylene glycol, triethylene glycol and various glycol/terephthalate monomers. Together with monoethylene glycol, and small quantities of other materials such as ash, manganese, water, antimony, these latter compounds make up the residue or liquid waste stream that is separated out from the polyethylene terephthalate. It is this waste stream that is useful as a polyol extender. If another alkylene glycol were used to produce another king of polyalkylene terephthalate; for example, propylene glycol to make polypropylene terephthalate, it would be expected that the residue from such a process would also be useful as a polyol extender in rigid foams. Another glycol that would be useful in preparing a polyalkylene terephthalate is 1,4-butanediol. Polybutylene terephthalate would result.

Preferably, the liquid waste stream has a hydroxyl number in the range between 150 and 500, with an especially preferred range between 200 and 400. The hydroxyl number will vary from stream to stream, depending on the content of glycols.

When this residue is blended with conventional polyols, foams with comparable properties are produced as compared with foams made only with the conventional polyols. The polyol extenders of this invention can also be used to prepare isocyanurate foams, without the addition of conventional polyols.

There is good compatibility of the polyols of this invention with trichlorofluoromethane. Trichlorofluoromethane, sold under the tradename FREON® R11B, a conventional blowing agent, is the gas entrapped in closed-cell rigid foams which accounts for the excellent insulating properties of these foams.

The second constituent of the overall polyol combination found particularly useful in preparing rigid polyurethane foams is a polyether polyol having a hydroxyl number of 200-800. Usually the polyether polyol comprises 0-95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2-8.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, trimethylolpropane, sucrose and alphamethyl glucoside.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

Especially preferred as the second polyol constituent are the nitrogen-containing polyether polyols described in U.S. Pat. Nos. 3,297,597 and 4,137,265, incorporated by reference herein. These particularly preferred polyols are marketed by Texaco Chemical Company as THANOL® R-350-X and THANOL R-650-X polyols. These polyols are prepared by reacting from 2 to 3 moles of propylene oxide with one mole of the Mannich reaction product of a mole of phenol or nonylphenol with one or two moles of diethanolamine.

The final polyol combination more preferably comprises 0–95 percent by weight of said polyether polyol and 100–5 percent by weight of aromatic ester polyol. Although the aromatic polyols of this invention may be used alone, it is preferred that they be present in an amount of from 30 to 70 weight percent of the polyol blend. The polyol combination in many instances has a total hydroxyl number ranging from about 200 to about 600. A preferred range is a hydroxyl number of from 300 to 500.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyantes therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenyl diisocyanate isomers with the remainder being polymethylene polyphenyl diisocyanates having higher functionalities and higher molecular weights. Typical of these are polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

In the production of rigid polyurethane foams in the practice of the invention, and known additives are necessary. One such constituent is the blowing agent. Some examples of such material are trichloromonofluoromethane, dichlorodifluoromethane, dichloromonofluoromethane, 1,1-dichloro-1-fluoroethane, 1,1-difluoro-1,2,2-trichloroethane, chloropentafluoroethane, and the like. Other useful blowing agents include low-boiling hydrocarbons such as butane, pentane, hexane, cyclohexane, and the like. See U.S. Pat. No. 3,072,582, for example. The polyols of this invention are quite compatible with fluorocarbon blowing agents unlike some of the prior art polyols which are made from DMT residues.

Surfactant agents, better known as silicone oils, are added to serve as a cell stabilizer. Some representative materials are sold under the names of SF-1109, L-520, L-521 and DC-193 which are, generally, polysiloxane polyoxyalkylene blocked co-polymers, such as those disclosed in U.S. Pat. Nos. 2,834,748; 2,917,480; and 2,846,458, for example.

Should further fire retardency be required for the polyurethane foam, two types of fire retardants are available; those that are incorporated by mere mechanical mixing and those that become chemically bound in the polymer chain. Representative of the first type are tris(chloroethyl)phosphate, tris(2,3-dibromopropyl)phosphate, diammonium phosphate, various halogenated compounds and antimony oxide. Representative of the chemically bound type are chlorendic acid derivatives, and various phosphorous-containing polyols.

The catalysts which may be used to make the foams of this invention are well known. There are two general types of catalyst, tertiary amines and organometallic compounds. Examples of suitable tertiary amines, used either individually or in mixture, are the N-alkylmorpholines, N-alkylalkanolamines, N,N-dialkylcyclohexylamines and alkylamines were the alkyl groups are methyl, ethyl, propyl, butyl, etc. Examples of specific tertiary amine catalysts useful in this invention are triethylenediamine, tetramethylethylenediamine, triethylamine, tripropylamine, tributylamine, triamylamine, pyridine, quinoline, dimethylpiperazine, dimethylhexahydroaniline, piperazine, N-ethylmorpholine, 2-methylpiperazine, dimethylaniline, nicotine, dimethylaminoethanol, tetramethylpropanediamine and methyltriethylenediamine. Useful organometallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloric, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organometallic compound are often used together in the polyurethane reaction.

The PET waste streams used here possess a relatively high antimony level, as will be demonstrated, which will provide an additional catalytic effect in the form creation.

The rigid polyurethane foams prepared here can be made in one step by reacting all the ingredients together at once (one-shot process) or the rigid foams can be made by the so-called "quasi-prepolymer method." In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

In a preferred embodiment the amount of polyol combination is used such that the isocyanato groups are present in the foam in at least an equivalent amount, and preferably in slight excess, compared with the free hydroxyl groups. Preferably, the ingredients will be proportional so as to provide for about 1.05 to about 8.0 mole equivalents of isocyanato groups per mole equivalent of hydroxyl groups.

The invention will be illustrated further with respect to the following specific examples, which are given by way of illustration and not given as limitations on the scope of this invention. The composition and properties of the polyol extenders of this invention will be presented along with examples of how these polyol extenders are used to prepare foams with improved qualities.

EXAMPLE I

Polyol Extender Analysis-Mixed Glycols and Monomers

This polyethylene terephthalate waste stream was provided by Eastman Chemical. The following analysis was also provided by them.

| Component | Composition | Normal Limits |
|---|---|---|
| Ethylene glycol | 12.0% | 18.0% max. |
| Diethylene glycol | 8.0 | 10.0 max. |
| Triethylene glycol | 4.0 | 10.0 max. |
| Ash, wt. % | 0.2 | 0.3 max. |
| Manganese, ppm | 10.0 | 100 max. |
| Water, wt. % | <1.0 | — |
| Acid number | 4.0 | — |
| Antimony, wt. % | <1.0 | — |
| Ethylene glycol monomer* | 14.6 | — |
| Diethylene glycol monomer | 10.7 | — |
| EG-DEG monomer | 4.3 | — |
| Mixed oligomer | 53.0 | — |
| Hydroxyl number | 400 | 550 |

*bis-(2-hydroxyethyl)terephthalate

Independent analysis by the inventor of the above waste stream gave the following results.

| | |
|---|---|
| Hydroxyl number | 288 |
| Acid number | 8.86 |
| Saponification number | 335.46 |
| Water, wt. % | 0.25 |
| Ash, % | 0.04 |
| Viscosity, cs, 25° C. | 10,036 |
| Manganese, ppm | 1.64 |
| Antimony, wt. % | 0.20 |

Preparation of Fire Retarded Rigid Polyurethane Foams

Rigid foams were prepared from 70:30 wt. % polyol blends of THANOL® R-350-X or R-650-X with the extenders of Example I, TERATE® 203 and CHEMPOL® 30-2150. TERATE 203 is a commercial polyol extender sold by Hercules, Inc. made by reacting dimethyl terephthalate residues with glycols according to the teaching of U.S. Pat. No. 3,647,759, incorporated by reference herein. CHEMPOL 30-2150 commercial polyol extender is made by Freeman Chemical Company by reacting recycled PET that has been pulverized with pure dimethyl glutarate and DEG in a transesterification operation. The formulation components were mixed at 2700 rpm and poured into an 8"×8"×12" (600 g pour) open mold and allowed to rise. The resulting foams were allowed to stand at room temperature for at least three days before testing. Formulations and foam physical properties are listed in Example II.

EXAMPLE II

THANOL® R-350-X Formulation

| | A | B | C | D |
|---|---|---|---|---|
| Formulation, pbw | | | | |
| THANOL R-350-X, Lot 1A410 (OH = 534) | 33.8 | 25.8 | 25.5 | 26.4 |
| Example I Extender (OH = 288) | — | 11.0 | — | — |
| TERATE 203 (OH = 318) | — | — | 10.9 | — |
| CHEMPOL 30-2150 (OH = 210) | — | — | — | 11.3 |
| FYROL PCF[1] | 5.0 | 5.0 | 5.0 | 5.0 |
| Water | 0.3 | 0.3 | 0.3 | 0.3 |
| FREON R-11B[2] | 13.0 | 13.0 | 13.0 | 13.0 |
| L-5420[3] | 0.5 | 0.5 | 0.5 | 0.5 |
| FOMREZ UL-32[4] | 0.01 | 0.01 | 0.01 | 0.01 |
| MONDUR MR[5] | 47.4 | 44.4 | 44.8 | 43.5 |
| (index = 1.1, 1.1, 1.1, 1.15) | | | | |
| Times, seconds, mixing | 10 | 6 | 10 | 9 |
| Times, seconds, cream | 26 | 12 | 15 | 17 |
| Times, seconds, gel | 66 | 45 | 57 | 67 |
| Times, seconds, tack free | 98 | 79 | 83 | 113 |
| Times, seconds, rise | 105 | 143 | 115 | 150 |
| Initial surface friability | None | None | None | None |
| Foam appearance | Very Good | Good | Good | Good |
| Physical Properties | | | | |
| Density, lbs/ft$^3$ | 1.87 | 1.68 | 1.68 | 1.72 |
| K-factor | 0.118 | 0.116 | 0.110 | 0.124 |
| Compressive strength, psi, | | | | |
| with rise | 41.44 | 41.04 | 37.13 | 40.20 |
| against rise | 19.26 | 10.34 | 12.69 | 11.17 |
| Heat distortion, °C. | 152 | 111 | 129 | 118 |
| Closed cells, % | 91.79 | 92.00 | 93.64 | 91.19 |
| Friability, wt. % loss, 10 min | 8.18 | 2.45 | 2.35 | 2.60 |
| ASTM 1692 Burn, in/min (BHA) | 2.49 | 1.88 | 2.08 | 1.63 |
| Butler Chimney Test | | | | |
| Flame height, in | >11 | >11 | >11 | >11 |
| Seconds to extinguish | 19 | 13 | 14 | 14 |
| Wt. % retained | 59.7 | 64.9 | 78.2 | 69.4 |

[1] Fire retardant sold by Stauffer Chemical Company
[2] Trichlorofluoromethane
[3] A silicone surfactant sold by Union Carbide Corp.
[4] A tin catalyst sold by Witco Chemical Corp.
[5] A polymeric isocyanate sold by Mobay Chemical Corp.

EXAMPLE III

THANOL® R-650-X Formulations

| | E | F | G | H |
|---|---|---|---|---|
| Formulation, pbw | | | | |

-continued

|  | E | F | G | H |
|---|---|---|---|---|
| THANOL R-650-X, lot OV-408 (OH = 455) | 37.0 | 27.6 | 27.2 | 28.3 |
| Example I extender (OH = 288) | — | 11.7 | — | — |
| TERATE 203 (OH = 318) | — | — | 11.7 | — |
| CHEMPOL 30-2150 (OH = 210) | — | — | — | 12.1 |
| FYROL PCF | 5.0 | 5.0 | 5.0 | 5.0 |
| Water | 0.3 | 0.3 | 0.3 | 0.3 |
| FREON R-11B | 13.0 | 13.0 | 13.0 | 13.0 |
| L-5420 | 0.5 | 0.5 | 0.5 | 0.5 |
| FOMREZ UL-32 | 0.01 | 0.01 | 0.01 | 0.01 |
| MONDUR MR | 44.2 | 41.8 | 42.3 | 40.8 |
| (index = 1.1, 1.1, 1.1, 1.15) | | | | |
| Time, seconds, mixing | 8 | 6 | 10 | 8 |
| Time, seconds, cream | 12 | 11 | 12 | 17 |
| Time, seconds, gel | 51 | 38 | 50 | 65 |
| Time, seconds, tack free | 64 | 57 | 60 | 99 |
| Time, seconds, rise | 109 | 113 | 84 | 156 |
| Initial surface friability | None | None | None | None |
| Foam appearance | Very Good | Good | Good | Good |
| Physical Properties | | | | |
| Density, lbs/ft$^3$ | 1.74 | 1.69 | 1.78 | 1.88 |
| K-factor | 0.118 | 0.105 | 0.113 | 0.120 |
| Compressive strength, psi, | | | | |
| with rise | 35.94 | 31.03 | 35.08 | 40.93 |
| against rise | 14.32 | 11.79 | 12.58 | 11.64 |
| Heat distortion, °C. | 137 | 129 | 138 | 110 |
| Closed cells, % | 92.02 | 92.88 | 94.86 | 92.55 |
| Friability, wt. % loss, 10 min | 6.19 | 3.53 | 2.37 | 1.30 |
| ASTM 1692 Burn, in/min (BHA) | 2.97 | 1.87 | 2.36 | 2.08 |
| Butler Chimney Test | | | | |
| Flame height, in | >11 | >11 | 9 | >11 |
| Seconds to extinguish | 14 | 10 | 12.3 | 11 |
| Wt. % retained | 63.9 | 66.6 | 79.0 | 73.5 |

EXAMPLE IV

Preparation of Polyisocyanurate Foams

The foams were prepared as in Examples II and III using an 8"×5"×6" open mold (200 g pour). Formulations and foam physical properties are listed below.

|  | I | J |
|---|---|---|
| Formulation, pbw | | |
| Example I extender (OH = 288) | 19.4 | — |
| CHEMPOL 30-2150 (OH = 210) | — | 23.7 |
| Silicone DC-193[1] | 0.5 | 0.5 |
| FREON R-11B | 12.0 | 12.0 |
| DABCO TMR-2[2] | 1.5 | 1.5 |
| MONDUR MR (index = 5.0, 5.2) | 66.6 | 62.3 |
| Times, seconds, mixing | 3 | 3 |
| Times, seconds, cream | 12 | 15 |
| Times, seconds, gel | 46 | 18 |
| Times, seconds, tack free | 49 | 21 |
| Times, seconds, rise | 76 | 56 |
| Initial surface friability | None | None |
| Foam appearance | Fair/Good | Good |
| Physical Properties | | |
| Density, lbs/ft$^3$ | 2.04 | 2.36 |
| Compressive strength, psi, | | |
| with rise | 32.70 | 48.34 |
| against rise | 16.66 | 22.03 |
| Heat distortion, °C. | >225 | 224 |
| Closed cells, % | 90.34 | 91.91 |
| Friability, wt. % loss, 10 min | 9.1 | 10.4 |

[1] A silicone surfactant sold by Dow-Corning Corp.
[2] A tertiary amine catalyst product of Air Products and Chemicals, Inc.

It may be seen from Examples II, III and IV that the liquid waste streams provide foams with comparable properties to those foams made without an extender or made with a commercial extender. It is important to realize that these waste streams are used "as is", without modification and are as a result very inexpensive.

Many modifications may be made in the method of this invention by those skilled in the art without departing from the spirit and scope of the invention which is defined only by the appended claims. For example, one could optimize the use of polyethylene terephthalate waste streams by appropriate modifications in reaction conditions.

I claim:

1. A method for producing a rigid polyisocyanurate foam comprising reacting in the presence of a blowing agent and a trimerization catalyst of polyisocyanurate formation, an organic polyisocyanate and a polyol component which comprises a liquid waste stream from polyethylene terephthalate manufacture which consists essentially of polyethylene terephthalate oligomers, monoethylene glycol, diethylene glycol and triethylene glycol.

2. The method of claim 1 in which the polyol component has an average hydroxyl number in the range from 150 to 500.

3. A rigid polyisocyanurate foam produced according to the method of claim 1.

* * * * *